Sept. 6, 1932.   A. J. MUSSELMAN   1,875,390

METHOD OF MAKING PNEUMATIC WHEELS

Filed May 31, 1930

Inventor
Alvin J. Musselman

By

Attorneys

Patented Sept. 6, 1932

1,875,390

UNITED STATES PATENT OFFICE

ALVIN J. MUSSELMAN, OF AKRON, OHIO, ASSIGNOR TO THE GOODYEAR TIRE & RUBBER COMPANY, OF AKRON, OHIO, A CORPORATION OF OHIO

METHOD OF MAKING PNEUMATIC WHEELS

Application filed May 31, 1930. Serial No. 457,710.

This invention relates to improved methods for making pneumatic wheels or tires, and it has particular relation to a novel method of constructing a relatively low pressure pneumatic wheel that is adapted to be mounted directly upon a hub.

One object of the invention is to provide a method of making a single tube pneumatic wheel which is adapted to be mounted directly upon a hub.

The general type of pneumatic wheel which is particularly useful as a part of airplane landing gear and is similar in function to the pneumatic wheel constituting the subject-matter of this invention, is disclosed in my co-pending applications Serial No. 203,107, filed July 2, 1927, issued Feb. 23, 1932, as Patent 1,846,269 and Serial No. 279,985, filed May 23, 1928, disclosing pneumatic wheels wherein a band of tire-building material is gathered or shirred upon bead elements until the bead portions of the tire are relatively small and are secured directly upon a rotatable support.

For a better understanding of the invention, reference may now be had to the accompanying drawing forming a part of this specification, of which Figure 1 is an elevational view of a pneumatic wheel constructed according to the invention;

Figure 3:
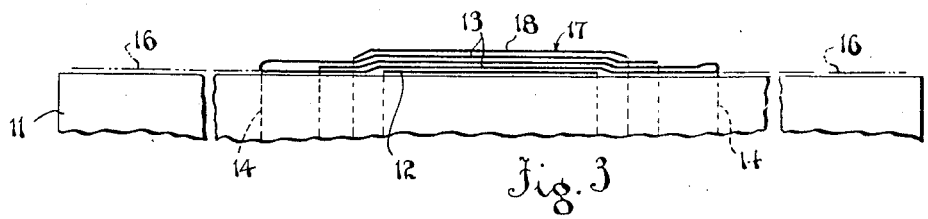
Figure 3 is a diagrammatical, fragmentary, cross-sectional view illustrating a method of building the pneumatic wheel.

In practising the invention, the first step of constructing a pneumatic wheel 10 comprises applying to a cylindrical building drum 11 a strip of uncured rubber compound 12, which is wound in one or more convolutions and is stitched to provide an endless band upon the drum. One or more plies 13 of fabric, such as rubberized cord fabric, or other similar tire-building material, is wound about the drum over the strip 12, and its edge portions are folded inwardly along lines 14 toward each other in overlapping relation from the position shown by the broken lines 16, to the position shown by the full lines of Figure 3, thus providing a tire carcass 17. Preferably, the drum 11 is treated with a nonadhesive substance prior to the application of the tire-building material, in order that the removal of the assembled material from the drum may be facilitated.

It will be observed that the edges of the band 12 are spaced from the lines 14, which include the edge or bead portions of the carcass 17. A tread 18 of rubber compound is applied to the carcass and then the assembled elements are removed by sliding them axially from the drum.

Figure 1:
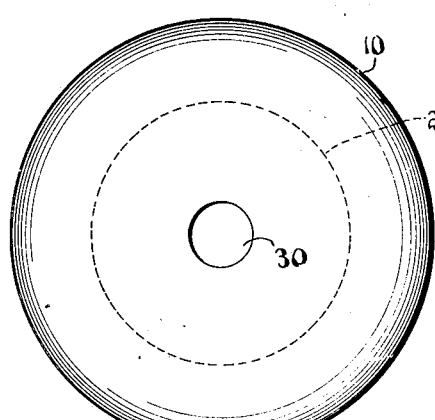
Figure 2:
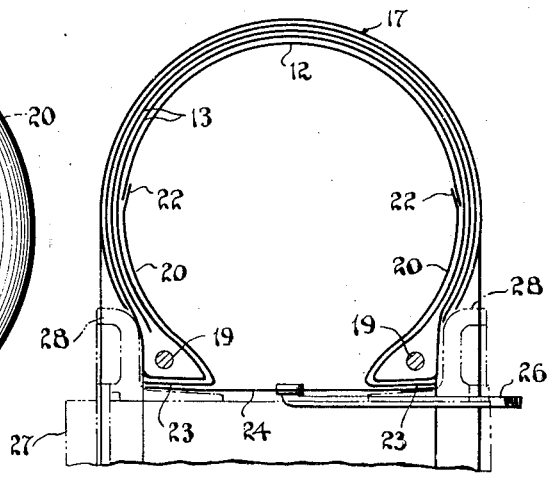
Figure 2 is a diagrammatical, cross-sectional view taken substantially along the line II—II of Figure 1.

By shirring the edge portions of the carcass upon bead elements 19 and properly shaping the carcass, the latter assumes the configuration shown by Figure 2. A conventional airbag may be inserted in the carcass and inflated for the purpose of shaping it into the form indicated, and is then removed. In this form, two annular discs 20 of rubber compound are inserted within the carcass and each disc is stitched in overlapping relation, as indicated at 22, about the respective edges of the band 12. The discs have their inner edges 23 directed outwardly and stitched about the inner circumferential bead portions of the carcass. Then a cylindrical sleeve 24 of uncured, or partially cured rubber compound, having a valve stem 26 secured therein, is applied through the bead portions of the carcass and stitched thereto, as indicated by Figure 2. A curing hub 27 having removable bead-engaging flanges 28 mounted thereon, is inserted through the cylindrical sleeve, either before or after the latter has been positioned within the bead portions of the carcass, and then the assembled elements are placed in a mold where the rubber composition thereof is subjected to vulcanization. After the vulcanization of the carcass, the curing hub is removed and the pneumatic tire is then ready for application upon a hub barrel 30 of suitable construction, such as that disclosed by my co-pending application Serial No. 432,648, filed March 3, 1930, which discloses a construction somewhat similar to that of the curing hub but adapted to receive braking elements therein.

It is to be understood that each or any of the elements 12, 20 and 24 may be partially vulcanized before it is applied to the tire carcass. If the sleeve 24 alone is partially vulcanized, the possibility of the rubber thinning about the inner circumferential portions of beads of the tire during vulcanization is reduced to a minimum.

Figure 5:
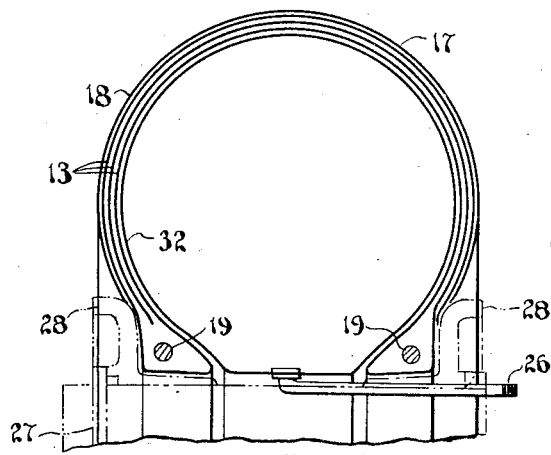
Figure 5 is a diagrammatical, cross-sectional view similar to that of Figure 2, of another form of the invention.
Figure 4:
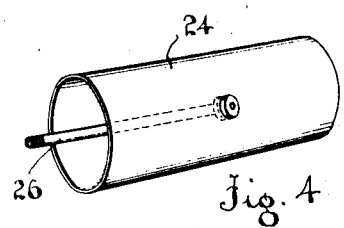
Figure 4 is a perspective view of a cylindrical member employed in practicing the invention.

In the embodiment of the invention illustrated by Fig. 5, a partially vulcanized inner tube 32 is inserted within the carcass 17 and after the curing hub 27 has been positioned in substantially the same manner as that described above, with reference to Fig. 2, the carcass and inner tube are vulcanized together in a conventional mold. Thus the inner tube 32 becomes an integral lining of the finished tire 10. Likewise, it is apparent that the integral inner tube comprises either the element 32 or the combined elements 12, 20 and 24.

From the foregoing description, it will be apparent that a pneumatic wheel or tire constructed according to this invention obviates the expense of manufacturing inner tubes which add considerably to the cost of a pneumatic wheel, and since the wheel is lined with a rubber compound similar to that employed in manufacturing inner tubes, the advantages of the latter are realized. In the event of punctures, the tire may be repaired by using plugs or patches common in the art, without the inconvenience of disassembling a tire, hub and inner tube in the manner required in repairing tires which includes a separate inner tube. Other advantages of the invention will be apparent because the mounting of the wheel is simplified and because the methods of construction are simple and direct. The invention is applicable to tires constructed according to the so-called flat-building method and it is apparent that the carcass shown by Figure 3 can be shaped according to that method.

Although only the prefered forms of the invention have been shown and described in detail, it will be apparent to those skilled in the art that the invention is not so limited but that various minor modifications may be made therein without departing from the spirit of the invention or from the scope of the appended claims.

What I claim is:

1. A method of making pneumatic wheels which comprises shaping rubberized fabric material into tire form, inserting a sleeve of vulcanizable material axially of the wheel through the bead portions thereof, securing the end portions of the sleeve in air-tight relation to the inner circumferential portions of the tire.

2. A method of making pneumatic tires which comprises lining the inner surface of a shaped tire with vulcanizable material, lapping the material about the bead portions of the tire, inserting a sleeve of vulcanizable material within the inner circumferential portion of the tire and securing the end portions of the sleeve to the lapped portions of the lining to form an air-tight chamber within the tire.

3. A method of making pneumatic tires which comprises shaping rubberized fabric material into tire form, inserting a sleeve of vulcanizable material axially of the tire in contacting relation to the inner circumferential bead portions of the tire, and vulcanizing the resulting construction.

4. A method of making pneumatic tires which comprises applying a strip of rubber compound to a cylindrical member, superposing relatively wider plies of tire-building material upon a strip of rubber compound, removing the construction from the cylindrical member, shaping the band into the form of a tire, applying layers of rubber about the inner walls of the tire in overlapping relation to the strip of rubber compound, and securing a sleeve of rubber compound about the inner peripheral portions of the beads to form a closure for the tire.

In witness whereof, I have hereunto signed my name.

Signed at Akron, in the county of Summit and State of Ohio, U. S. A., this 26th day of May, 1930.

ALVIN J. MUSSELMAN.